July 6, 1937.　　　M. W. HOLLENBECK　　　2,086,081
GARDEN SHEARS
Filed Aug. 5, 1936
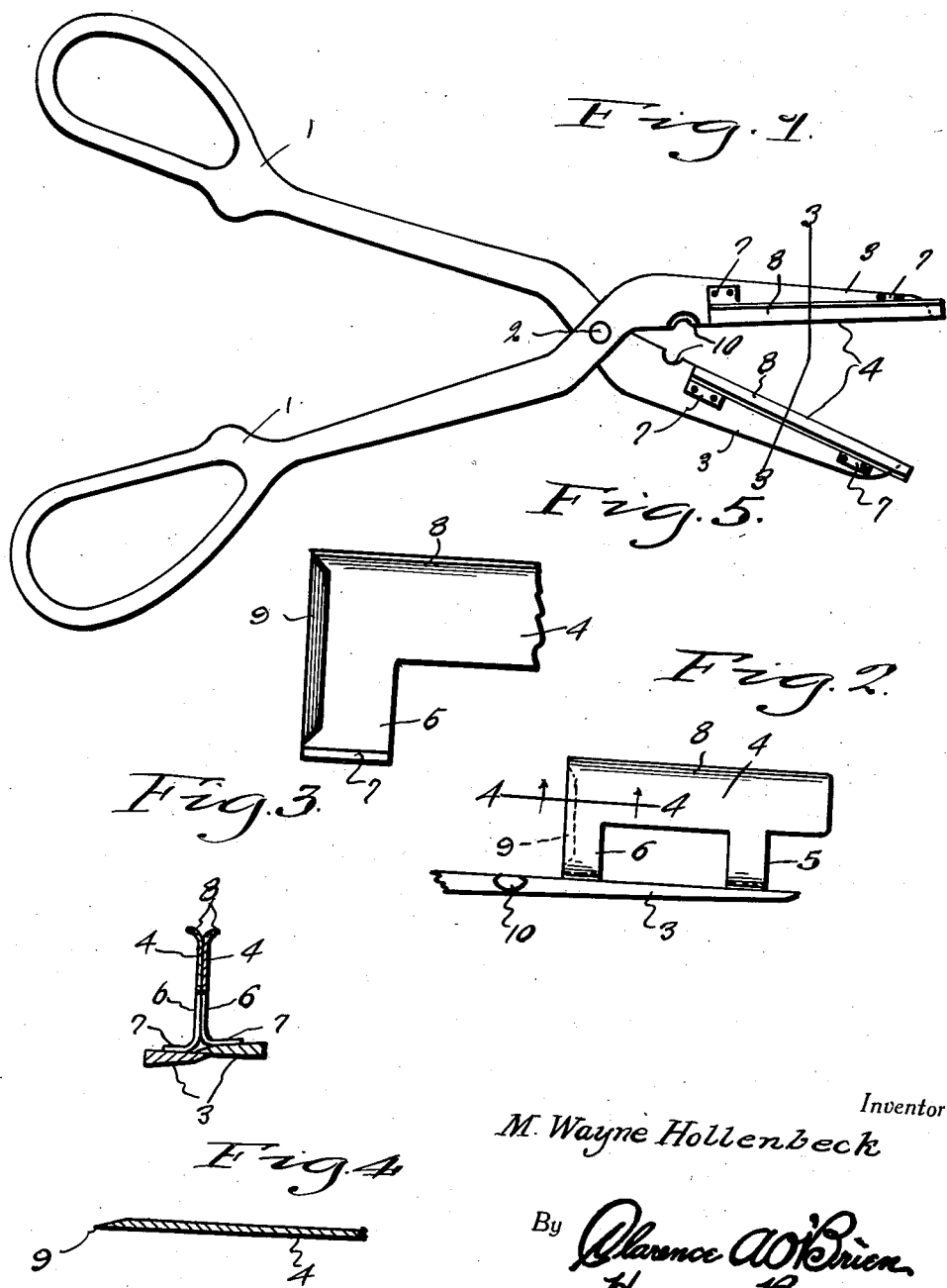
Inventor
M. Wayne Hollenbeck
By Clarence A. O'Brien
Hyman Berman
Attorneys Patented July 6, 1937

2,086,081

UNITED STATES PATENT OFFICE 2,086,081

GARDEN SHEARS

Merritt Wayne Hollenbeck, Willowbrook, Calif.

Application August 5, 1936, Serial No. 94,460

1 Claim. (Cl. 30—134)

The present invention relates to new and useful improvements in garden shears and has for its primary object to provide, in a manner as hereinafter set forth, a tool of this character embodying novel means for gripping and holding flowers and other plants as they are cut.

Another very important object of the invention is to provide a tool of the aforementioned character embodying novel means through the medium of which comparatively large plants may be expeditiously cut with a minimum of effort.

Other objects of the invention are to provide garden shears of the character described which will be comparatively simple in construction, strong, durable, highly efficient and reliable in use, compact, light in weight and which may be manufactured at low cost.

All of the foregoing and still further objects and advantages of the invention will become apparent from a study of the following specification, taken in connection with the accompanying drawing wherein like characters of reference designate corresponding parts throughout the several views, and wherein:—

Figure 1 is a top plan view of the invention, showing the same in open position.

Figure 2 is a view in side elevation of one of the blades with the jaw or clamp mounted thereon.

Figure 3 is a cross sectional view through the closed blades, taken substantially on the line 3—3 of Figure 1.

Figure 4 is a fragmentary view in horizontal section through one of the jaws or clamps, taken substantially on the line 4—4 of Figure 2.

Figure 5 is a view in side elevation of a portion of one of the jaws or clamps.

Referring now to the drawing in detail, it will be seen that the embodiment of the invention which has been illustrated comprises a pair of handles 1 which are crossed and pivotally connected at one end, as at 2. Extending from the pivoted ends of the handles 1 is a pair of integral coacting blades 3.

The reference numeral 4 designates a pair of opposed, coacting jaws which are mounted on the blades 3, said jaws being preferably of suitable sheet metal. The jaws 4 include integral supporting legs 5 and 6 having out-turned feet 7 which are secured to the blades 3. The upper portions of the jaws 4 are curved outwardly in a manner to form flanges 8.

As best seen in Figure 2 of the drawing, the legs 5 are spaced inwardly from the outer ends of the jaws 4 while the legs 6 are flush with the inner ends of said jaws. Bevelled cutting edges 9 are provided on the inner ends of the jaws 4 and the legs 6. The inner portions of the blades 3 are notched or recessed, as at 10, to facilitate the cutting of comparatively large plants.

It is thought that the manner of using the device will be readily apparent from a consideration of the foregoing. The stems of the flowers are, of course, cut between the blades 3. As the cutting edges of the blades 3 are brought together the resilient jaws 4 engage and clamp the stem of the flower therebetween in a manner to retain the same after said stem has been severed. It will thus be seen that the flowers and other plants may be conveniently cut and held with one hand. As hereinbefore stated, the notched or recessed portions 10 of the blades 3 facilitate the cutting of comparatively large plants. The cutting edges 9 permit the tool to be used substantially in the manner of a brush hook or the like.

It is believed that the many advantages of a garden tool constructed in accordance with the present invention will be readily understood, and although a preferred embodiment of the device is as illustrated and described, it is to be understood that changes in the details of construction and in the combination and arrangement of parts may be resorted to which will fall within the scope of the invention as claimed.

What is claimed is:—

A tool of the class described comprising a pair of pivoted blades, jaws of resilient material mounted on the blades, said jaws including integral depending legs at longitudinally spaced points, said legs comprising out-turned feet secured to the blades, one of the legs being spaced inwardly from the outer ends of the jaws, the other of said legs being flush with the inner ends of the jaws, and a cutting edge on the inner ends of the jaws and said one leg of each jaw.

MERRITT WAYNE HOLLENBECK.